UNITED STATES PATENT OFFICE.

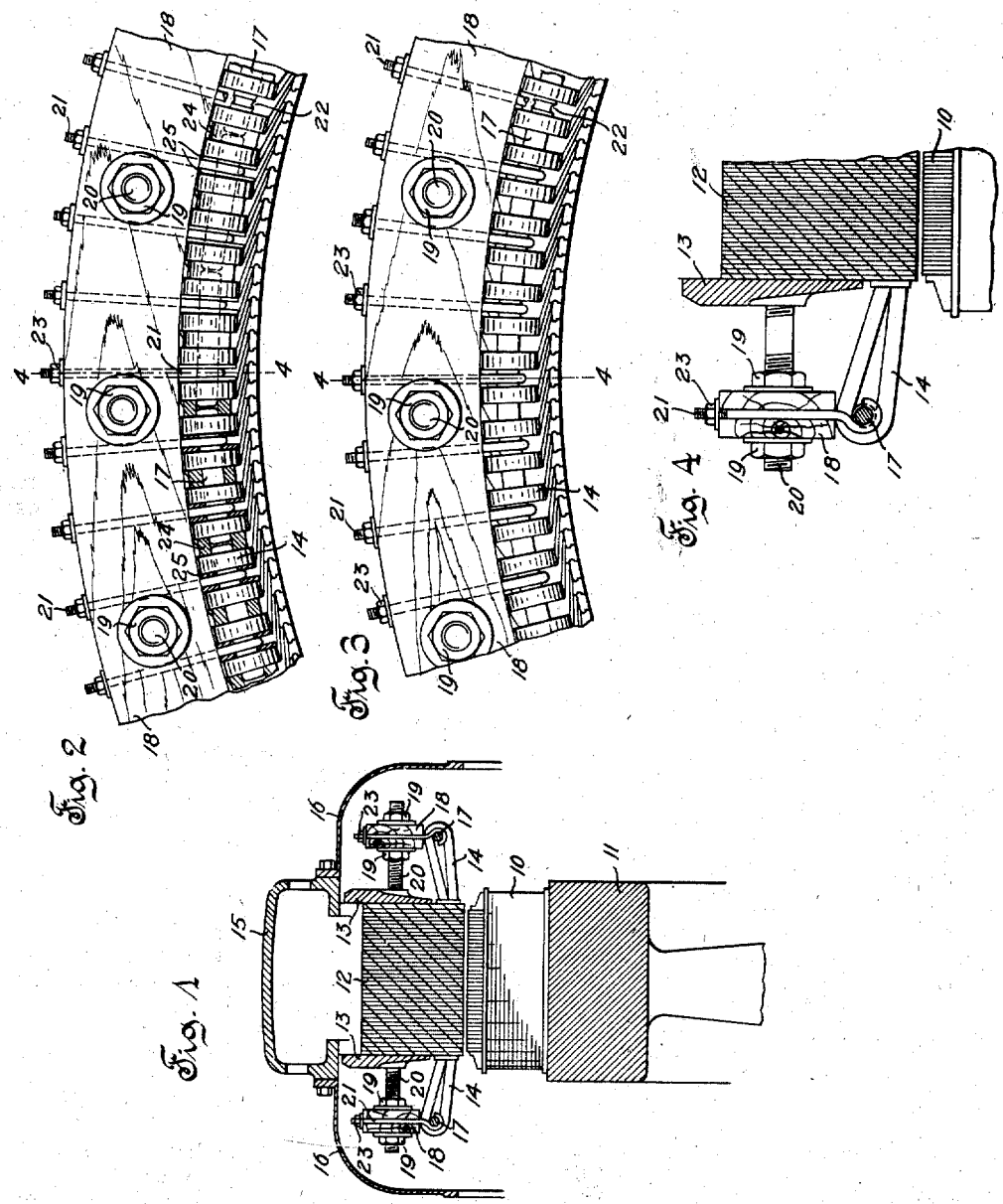

WALTER P. DANDLIKER, OF WEST ALLIS, WISCONSIN, ASSIGNOR TO ALLIS-CHALMERS COMPANY, A CORPORATION OF NEW JERSEY.

DYNAMO-ELECTRIC MACHINE.

995,441. Specification of Letters Patent. Patented June 20, 1911.

Application filed October 1, 1910. Serial No. 584,801.

*To all whom it may concern:*

Be it known that I, WALTER P. DANDLIKER, a citizen of Switzerland, residing at West Allis, in the county of Milwaukee and State of Wisconsin, have invented certain new and useful Improvements in Dynamo-Electric Machines, of which the following is a full, clear, and exact specification.

My invention relates to dynamo-electric machines, and particularly to supporting of the projecting end turns of their windings.

Those parts of the windings of dynamo-electric machines which project beyond the ends of the core slots often need special support, as without such support they are liable to violent distortion; especially in case of accident, such as a short-circuit.

It is the object of my present invention to provide simply and efficiently for supporting such projecting end turns.

In most dynamo-electric machines the end turns make loops, and each loop generally includes a half turn the plane of which passes through the axis of the machine. In carrying out my invention I run rods through the loops forming the end turns, and support such rods from the frame of that member of the machine of which the windings form part.

The various novel features of my invention will appear from the description and drawings, and will be particularly pointed out in the claims.

Figure 1 is a partial section through a dynamo-electric machine embodying my invention; Figs. 2 and 3 are partial end views of the stator of such machine with the end cover removed, and show two modifications of my invention; and Fig. 4 is a sectional view on the line 4—4 of either Fig. 2 or Fig. 3.

Although my invention is not limited to such application, I have shown it as used for supporting the end turns of the stator windings of a definite pole, rotating field alternator. The rotor comprises a number of poles 10 mounted on a rim 11 supported in the usual manner by a shaft, hub, and radial arms. The stator comprises a slotted, annular, laminated core 12 clamped between end plates 13, and armature windings having projecting end portions 14. The stator core may be mounted, if desired, in a yoke 15, which, if desired, may carry end covers 16.

Each end turn 14 makes a loop, including a half turn in a plane passing through the axis of the machine. Rods 17 extend through these loops, preferably on the axes of the aforesaid half turns. These rods may be short ones, as illustrated in Fig. 2, in which case they extend through but a few of the end turns; as illustrated, they extend through four end turns. If short rods are used they are preferably straight, as illustrated, though this is not necessary. If the rods 17 are curved they may be made longer, as illustrated in Fig. 3; if desired, they may extend entirely around the machine through all the end turns at one end of the machine, the rods then in reality forming split rings. Rings 18, preferably made of wood or other insulating material, are clamped between nuts 19 on a series of threaded posts 20 projecting from the end plates 13 or from any other convenient part of the stator frame. The rods 17 are supported from the rings 18 by means of bolts 21 which extend through such rings and are attached in any suitable way to the rods 17. Preferably the bolts 21 are hook bolts, and grasp the rods 17. The hooks of the bolts 21 may be seated in grooves 22 in the rods 17. By tightening the nuts 23 of the hook bolts 21, the rods 17 are drawn toward the rings 18 and the end turns 14 are clamped against such rings. In case any adjustment of the rings 18 axially of the machine is desired, such adjustment may be obtained by means of the nuts 19. If desired, the end turns 14 may be spaced apart on the rods 17 by washers 24 and 25, though in many cases such washers are not necessary.

Many modifications in the precise arrangements shown and described may be made without departing from the spirit and scope of my invention, and all such modifications I aim to cover in the following claims.

What I claim as new is:

1. In a dynamo-electric machine, the combination of a slotted core, coils in the slots of the core and having end turns outside the slots, rods passing through the end turns, and washers on said rods for separating adjacent end turns.

2. In a dynamo-electric machine, the combination of a slotted core, coils located in the slots of the core and having end turns beyond the ends of the slots, rods extending through the end turns, and means for supporting said rods.

3. In a dynamo-electric machine, the combination of a slotted core, coils located in the slots of the core and having end turns beyond the ends of the slots, rods each extending through the end turns of a plurality of coils, and means for adjustably supporting said rods.

4. In a dynamo-electric machine, the combination of a slotted annular core, coils in the slots in the core and having end turns beyond the ends of the slots, rods extending through the end turns, a ring mounted at each end of the core and substantially concentric therewith, and means for fastening the rods to the rings.

5. In a dynamo-electric machine, the combination of a slotted annular core, coils located in the slots of the core and having end turns beyond the ends of the slots, rods each extending through a plurality of end turns, rings of insulating material fixed relatively to the core, and means for supporting said rods from said rings.

6. In a dynamo-electric machine, the combination of a slotted annular core, coils located in the slots of the core and having end turns beyond the ends of the slots, rods each extending through a plurality of end turns, rings of insulating material fixed relatively to the core, and means for drawing the rods to the rings to clamp the end turns between the rings and rods.

7. In a dynamo-electric machine, the combination of a slotted core, a frame supporting said core, coils in the slots of said core and having end turns beyond the ends of the slots, rods extending through the end turns, and means for supporting said rods from said frame.

8. In a dynamo-electric machine, the combination of a slotted core, coils in the slots of said core and having end turns beyond the ends of the core, rods extending through said end turns, a member fixed relatively to the core, and bolts for fastening said rods to said members.

9. In a dynamo-electric machine, the combination of a core and coils, the latter having end turns which project beyond an end of the core, a rod passing through said end-turns, and means coöperating with said rod for clamping the end-turns in place.

10. In a dynamo-electric machine, the combination of a core and coils, the latter having end-turns which project beyond an end of the core, a curved rod threaded through said end turns, and means for supporting said curved rod.

11. In a dynamo-electric machine, the combination of a slotted core, coils in the slots of said core and having end turns beyond an end of the core, a curved rod passing through said end turns, and means coöperating with said rod for clamping said end turns in place.

12. In a dynamo-electric machine, the combination of a core and coils, the latter having end turns which project beyond an end of the core and each include a portion bent in a plane which passes through the axis of the machine, a curved rod threaded through said bent portions, and means for supporting said rod.

13. In a dynamo-electric machine, the combination of a slotted core, coils in the slots of the core and having end turns beyond an end of the core, said end turns each including a loop bent in a plane passing through the axis of the machine, a rod passing through a plurality of said loops, and means for supporting said rod.

Milwaukee, Wis., Sept. 28, 1910.

In testimony whereof I affix my signature, in the presence of two witnesses.

WALTER P. DANDLIKER.

Witnesses:
G. B. SCHLEY,
CHAS. L. BYRON.